United States Patent
Strandborg et al.

(12) 
(10) Patent No.: US 12,422,924 B2
(45) Date of Patent: Sep. 23, 2025

(54) GAZE DEPTH-ASSISTED ENCODING OF REGION OF INTEREST IN IMAGES

(71) Applicant: Varjo Technologies Oy, Helsinki (FI)

(72) Inventors: Mikko Strandborg, Helsinki (FI); Timo Toivanen, Helsinki (FI); Mikko Ollila, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 132 days.

(21) Appl. No.: 18/505,680

(22) Filed: Nov. 9, 2023

(65) Prior Publication Data

US 2025/0155970 A1    May 15, 2025

(51) Int. Cl.
| | |
|---|---|
| *G06F 3/01* | (2006.01) |
| *G06T 7/50* | (2017.01) |
| *G06T 9/00* | (2006.01) |
| *G06T 15/00* | (2011.01) |
| *G06V 10/25* | (2022.01) |

(52) U.S. Cl.
CPC ................ *G06F 3/013* (2013.01); *G06T 7/50* (2017.01); *G06T 9/00* (2013.01); *G06T 15/00* (2013.01); *G06V 10/25* (2022.01); *G06T 2207/10028* (2013.01)

(58) Field of Classification Search
None
See application file for complete search history.

(56) References Cited

U.S. PATENT DOCUMENTS

| | | | |
|---|---|---|---|
| 12,265,680 B1* | 4/2025 | Levatich | G06F 3/011 |
| 2019/0380792 A1* | 12/2019 | Poltaretskyi | A61B 90/39 |
| 2023/0146371 A1* | 5/2023 | Gargac | G02B 27/0093 |
| 2024/0223780 A1* | 7/2024 | Kim | G06T 7/11 |
| 2024/0257419 A1* | 8/2024 | He | G06T 7/73 |

* cited by examiner

*Primary Examiner* — Talha M Nawaz
(74) *Attorney, Agent, or Firm* — ZIEGLER IP LAW GROUP, LLC.

(57) ABSTRACT

A system includes at least one server configured to receive, from a client device, information indicative of gaze directions of a user's eyes; determine a gaze point and a gaze depth of the user's eyes, using said information; identify, in an image, a gaze-contingent region that includes and surrounds the gaze point; identify a region of interest in the gaze-contingent region, wherein the region of interest comprises pixels whose optical depth lies within a first predefined distance ($\Delta d1$) from the gaze depth; encode the image by applying a first encoding setting to the pixels belonging to the region of interest; and send the image that is encoded, to the client device.

11 Claims, 5 Drawing Sheets

GAZE DEPTH-ASSISTED ENCODING OF REGION OF INTEREST IN IMAGES

TECHNICAL FIELD

The present disclosure relates to systems. Moreover, the present disclosure relates to methods.

BACKGROUND

In recent times, remote extended reality (XR) streaming technologies have gained significant importance due to their diverse applications, such as XR-based education, teleconferencing, gaming, and medical simulations. Such technologies rely on lossy video compression algorithms, which employ various heuristics, including human psychovisual models, to determine which parts of images or videos to transmit and which parts to eliminate, thereby minimizing a bandwidth required for streaming.

Conventionally, a High Efficiency Video Coding (HEVC) technique is a widely adopted compression technique that allows users to define Regions-of-Interest (ROI) within encoded image or video frames. Such ROIs are designated to be encoded with a higher priority, ensuring that specific regions are transmitted with superior visual quality. However, the ROIs identified by such conventional technique are limited to a two-dimensional area. Moreover, the conventional techniques lack accuracy and efficiency in identifying the ROIs. Furthermore, the encoded images or videos of the ROIs that are generated by applying the conventional techniques have a significantly lower visual quality that what is required in the XR streaming technologies.

Therefore, in light of the foregoing discussion, there exists a need to overcome the aforementioned drawbacks.

SUMMARY

The aim of the present disclosure is to provide a system and a method to improve an image quality of encoded images. The aim of the present disclosure is achieved by a system and a method for gaze depth-assisted encoding of region of interest in images as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
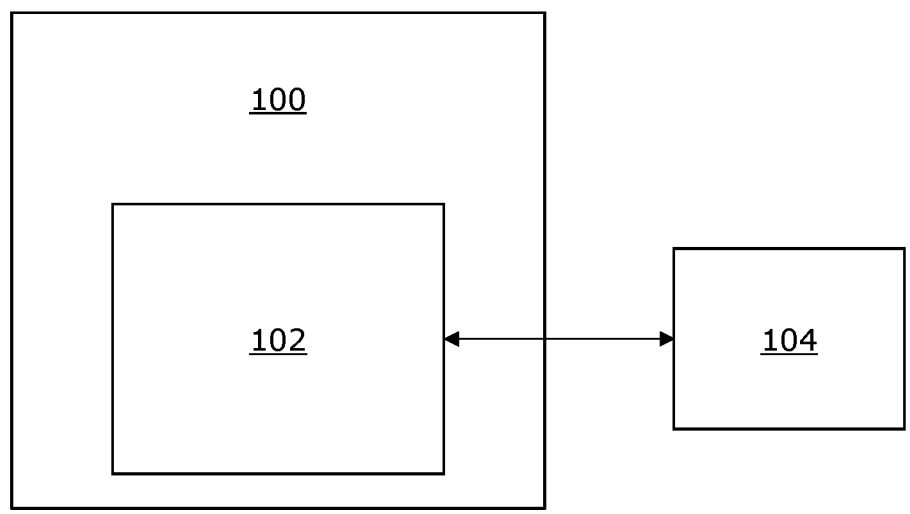
FIG. 1 is an illustration of a block diagram of a system, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a system comprising at least one server configured to:
receive, from a client device, information indicative of gaze directions of a user's eyes;
determine a gaze point and a gaze depth of the user's eyes, using said information;
identify, in an image, a gaze-contingent region that includes and surrounds the gaze point;
identify a region of interest in the gaze-contingent region, wherein the region of interest comprises pixels whose optical depth lies within a first predefined distance from the gaze depth;
encode the image by applying a first encoding setting to the pixels belonging to the region of interest; and
send the image that is encoded, to the client device.

The present disclosure provides an aforementioned system. The system significantly improves an accuracy and efficiency of identifying the region of interest in the gaze-contingent region. Moreover, the system is able to successfully identify the region of interest in the gaze-contingent region in form of a three-dimensional volume. Furthermore, the system succeeds in encoding the pixels belonging to the region of interest with a significantly superior visual quality in comparison to the other pixels in the image.

In a second aspect, the present disclosure provides a method comprising:
receiving, from a client device, information indicative of gaze directions of a user's eyes;
determining a gaze point and a gaze depth of the user's eyes, using said information;
identifying, in an image, a gaze-contingent region that includes and surrounds the gaze point;
identifying a region of interest in the gaze-contingent region, wherein the region of interest comprises pixels whose optical depth lies within a first predefined distance from the gaze depth;
encoding the image by applying a first encoding setting to the pixels belonging to the region of interest; and
sending the image that is encoded, to the client device.

The present disclosure provides an aforementioned system. The system significantly improves an accuracy and efficiency of identifying the region of interest in the gaze-contingent region. Moreover, the system is able to successfully identify the region of interest in the gaze-contingent region in form of a three-dimensional volume. Furthermore, the system succeeds in encoding the pixels belonging to the region of interest with a significantly superior visual quality in comparison to the other pixels in the image.

Throughout the present disclosure, the term "server" refers to a computational element that is operable to execute instructions of the system. It will be appreciated that the term "at least one server" refers to "one server" in some implementations, and "a plurality of servers" in other implementations. Examples of the at least one server include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the at least one server may refer to one or more individual servers, processing devices and various elements associated with a processing device that may be shared by other processing devices. Additionally, one or more individual servers, processing devices and elements are arranged in various architectures for responding to and processing the instructions that execute the instructions of the system.

Throughout the present disclosure, the "client device" refers to a device associated with a user which is implemented in Extended-Reality (XR) applications to display images and/or videos to the user. Notably, the ER applications encompasses Virtual-Reality (VR), Augmented-Reality (AR), Mixed-Reality (MR) applications. It will be appreciated that the client device comprises a gaze tracking means which collects the information that is indicative of the gaze directions of the user's eyes. The gaze-tracking means are well-known in the art. Notably, the user's eyes refer to a first eye of the user and a second eye of the user collectively. Throughout the present disclosure, the term "gaze directions of the user's eyes" collectively refers to a first gaze direction towards which the first eye of the user is gazing in an XR environment (i.e., a three dimensional visual scene that is viewed by the user in the XR application and a second gaze direction towards which the second eye of the user is gazing in the XR environment. Notably, the gaze directions of the user's eyes are determined from a specific pose (i.e., a specific position and/or specific orientation) of user's head. It will be appreciated that the system is communicably coupled with the client device for receiving the information indicative of the gaze directions of the user's eyes.

Throughout the present disclosure, the term "gaze point" refers to a point in the XR environment at which the user's gaze is focused. The gaze point is a point of interest of the user, in the XR environment towards which the user is gazing. Notably, the gaze point is determined by mapping the gaze directions of the user's eyes to a corresponding point in the XR environment, at which the gaze directions converge. Subsequently, said information indicative of the gaze directions of the user's eyes is used to determine the gaze point. Throughout the present disclosure, the term "gaze depth" refers to an optical distance between the gaze point and the user's eye, in the XR environment. Optionally, the gaze depth of the gaze point in the XR environment lies in a range of 20 cm to infinity. More optionally, the gaze depth of the gaze point in the XR environment lies in a range of 50 cm to infinity. For example, the gaze depth of the gaze point may be from 20, 25, 30, 35, 40, 45, 50, 60, 70, 80, 100 or 120 cm up to 50, 75, 100, 125, 150 or infinity cm. It will be appreciated that the gaze depth is different from a physical distance between the user's eyes and the client device. For example, the physical distance between the user's eyes and the client device may be 5 centimeters (cm), but the gaze depth may be 1 meters (m). It will be appreciated that the gaze point and the gaze depth are determined for the specific pose of the user's head from which the gaze directions of the user's eyes are determined.

Optionally, when determining the gaze point and the gaze depth of the user's eyes, the at least one server is configured to perform one of:
  identify the gaze point to be a point in a previous image at which the gaze directions of the user's eyes converged, and identify the gaze depth to be an optical depth associated with said point in an environment represented by the previous image;
  identify the gaze point to be a point in a previous image at which the gaze directions of the user's eyes converged, and identify the gaze depth to be an optical depth at which at least one autofocus camera was focused for capturing a previous real-world image, wherein the previous image comprises the previous real-world image;
  identify the gaze point to be a point in a previous image at which the gaze directions of the user's eyes converged, and determine the gaze depth using a depth value of a virtual object present at said point;
  predict the gaze point to be a point in the image at which the gaze directions of the user's eyes are expected to converge at a future time instant, and identify the gaze depth to be an optical depth associated with said point in an environment represented by the image.

In this regard, the term "previous image" refers to a visual representation of the environment at an instance of time prior to that instance of time for which the image is generated. Optionally, the environment represented by the previous image is one of: the VR environment, the AR environment. Notably, when the previous image is displayed at the client device and the user gazes at it, the information indicative of the gaze directions of the user's eyes is captured by the gaze-tracking means of the client device, and the information is sent to the at least one server from the client device. Subsequently, said point at which the gaze directions of the user's eyes converge is identified by mapping the gaze directions of the user's eyes in the environment represented by the previous image. It will be appreciated that the optical depth associated with the said point is determined from a depth buffer associated with the at least one server. A technical effect is that the gaze point and the gaze depth are effectively and accurately identified using the previous image.

Alternatively, when the environment represented by the previous image is one of: the MR environment, the real-world environment, then the previous image comprises the previous real-world image which is required to create the one of: the MR environment, the real-world environment represented by the previous image. Throughout the present disclosure, the term "previous real-world image" refers to a visual representation of the real-world environment at the instance of time prior to that instance of time for which the image is generated. Subsequently, the optical depth at which the at least one autofocus camera was focused for capturing the real-world image is identified as the gaze depth because the optical depth of the at least one autofocus camera was already determined based on the identified gaze point from where the gaze depth is to be identified. A technical effect is that the gaze point and the gaze depth are effectively and accurately identified when the previous comprises the previous real-world image.

Alternatively, in scenarios when the virtual object (i.e., a virtually generated entity rendered in the previous image) is present at said point, then the depth value of the virtual object is used to determine the gaze depth. The depth value of the virtual object is determined using one of: a value present in the depth buffer for said point, an average of two depth values determined from a virtual point of convergence of the gaze directions of the user's eyes by performing ray marching in the respective gaze directions of the user's eyes, one of the two depth values determined from the virtual point of convergence of the gaze directions of the user's eyes. A technical effect is that the gaze point and the gaze depth are effectively and accurately identified in scenarios when the virtual object is present at said point.

Alternatively, said point in the image at which the gaze directions of the user's eyes are expected to converge at the future time instant, is determined by performing ray marching in the respective gaze directions of the user's eyes and determine said point at which the gaze directions of the user's eyes virtually converge. Optionally, said point is one of: a point at which an interactive virtual object would be present at the future time instant in the image, a point at which a moving object would be present at the future time instant in the image, or a present point at which a visually attractive object would be present at the future time instant in the image, and the like. Subsequently, the optical depth associated with said point which is present in the depth buffer associated with the at least one server, is identified as the gaze depth. A technical effect is that the gaze point and gaze depth are effectively and accurately identified for the future time instant in the image.

Throughout the present disclosure, the term "image" refers to a visual representation of the XR environment viewed by the user from the specific pose of the user's head for which the gaze point and the gaze depth are determined. In an embodiment when the XR environment encompasses at least one of: the AR environment, the MR environment, the image is a visual see through (VST) image of a real-world environment of the user viewed by the user from the specific pose of the user's head, which is received from the client device.

Optionally, the image is any image for which per-pixel depth information is available to the at least one server, said image being at least one of:
 a virtual-reality image;
 a depth image captured by a depth sensor;
 a real-world depth image captured by a depth sensor-based video see-through camera;
 an image reconstructed using a three-dimensional data structure representing a three-dimensional environment.

In this regard, the term "per-pixel depth information" refers to information related to the optical depth of each pixel in said image. It will be appreciated that the said image refer to that image for which the per-pixel depth information is available to the at least one server. Notably, the image being any image for which the per-pixel depth information is available to the at least one server enables to determine the gaze depth if the gaze point is identified in said image. Throughout the present disclosure, the term "virtual-reality image" refers to a computer-generated image which is generated by a rendering application executed on the at least one server. Notably, the virtual-reality image includes depth values associated with each pixel in the virtual-reality image, where the depth values are known to the rendering application that generates the virtual-reality image and subsequently, the depth values are known to the at least one server. Throughout the present disclosure, the term "depth image" refers to that image which does not depict any visual information of the real-world environment but only the depth values of points in the real-world environment. Throughout the present disclosure, the term "depth sensor" refers to a sensor that is operable to at least detect optical depths in the real-world environment so as to capture the plurality of depth images of the real-world environment. It will be appreciated that the depth sensor is well-known in the art. Throughout the present disclosure, the term "real-world depth image" refers to an image generated using a combination of the depth image with a real-world image (i.e., a video see through image) to provide real-world visual information along with its corresponding depth information. Examples of the depth sensor-based video see-through camera include but are not limited to a Red Green Blue-Depth (RGB-D) camera, a Red Green Blue (RGB) camera, and the like having the depth sensor (such as a LIDAR sensor, a ToF sensor, and the like). Notably, examples of the three-dimensional data structure include but are not limited to a three-dimensional map, a point cloud. Moreover, the three-dimensional environment may be the XR environment. A technical effect is that the image being used is suitable for accurate identification of the gaze point and the gaze depth as the per-pixel depth information is available for the image.

Throughout the present disclosure, the term "gaze-contingent region" refers to a part of the image that is identified as surrounding the gaze point in the image. Subsequently, the gaze point is included in the gaze-contingent region. Notably, identifying the gaze-contingent region in the images enables identification of that part of the image which is paid more attention from the user in comparison to a remaining part of the image, as the gaze point towards which the user's gaze is focused is included in the gaze-contingent region. Optionally, an angular extent of the gaze-contingent region lies in a range of 5 degrees to 60 degrees. In other words, the gaze-contingent region extends from the gaze point till a distance of 2 degrees to 30 degrees of visual field from the gaze point.

Throughout the present disclosure, the term "region of interest" refers to a region identified in the gaze-contingent region which needs to be encoded while ensuring less loss of information for the pixels belonging to the region of interest in comparison to the remaining part of the image. Notably, the region of interest is identified by identifying those pixels in the image whose optical depth lies within the first predefined distance from the gaze depth, as all of those pixels whose optical depth lies within the first predefined distance from the gaze depth, lies within close proximity around a pixel in the image from where the gaze depth is determined. Throughout the present disclosure, the term "first predefined distance" refers to that numerical value which determines what is the area of close proximity around the pixel in the image from where the gaze depth is determined, which is used to identify the region of interest. Notably, a higher value of the first predefined distance results in a larger region of interest in comparison to a lower value of the first predefined distance which results in a smaller region of interest. For example, the region of interest identified in the gaze contingent region comprises pixels whose optical depth lies within 1 cm from the gaze depth. Optionally, the first predefined distance is dependent on the gaze depth. Optionally, the first predefined distance lies in a range of 2 millimetres to 1 metre. In an example, when the gaze depth is 20 centimetres, the first predefined distance may be 5 centimetres. In another example, when the gaze depth is 3 metres, the first predefined distance may be 0.5 metres.

Optionally, the region of interest further comprises pixels that lie within a second predefined distance from the gaze point. In this regard, the region of interest is identified by identifying those pixels in the image that lie within the second predefined distance from the gaze point in addition to those pixels whose optical depth lies within the first predefined distance from the gaze depth, as all of those pixels that lie within the second predefined distance from the gaze point, lies within close proximity around a pixel in the image from where the gaze point and gaze depth are determined. Throughout the present disclosure, the term "second predefined distance" refers to that numerical value which determines what is an area of close proximity around the pixel in the image where the gaze point is determined, which is includes in the region of interest. Optionally, the second predefined distance lies in a range of 1 degree to 10 degrees of angular distance. A technical effect of the region of interest further comprising pixels that lie within the second predefined distance from the gaze point is that the region of interest is identified as a three dimensional (3D) space around a volume in the image on which the user's gaze is focused.

Notably, the image is encoded using the at least one server as the image needs to be compressed to make the image suitable to be displayed in real time to the user via the client device for the XR applications while using networks with low bandwidth. It will be appreciated that encoding algorithms to encode the image are well-known in the art. Notably, the image is encoded by employing a lossy compression algorithm (for example, a high efficiency video coding algorithm). Throughout the present disclosure, the term "first encoding setting" refers to those specific adjustments that are made in encoding the pixels belonging to the region of interest which ensures that the pixels belonging to the region of interest are encoded with minimum loss of information. It will be appreciated that applying the first encoding setting to the pixels belonging to the region of interest ensures that a visual quality of the pixels belonging to the region of interest is less deteriorated in comparison to a visual quality of pixels belonging to the remaining part of the image, as when the user's focus will be more on the pixels belonging to the region of interest in comparison to the pixels belonging to the remaining part of the image.

Optionally, the first encoding setting comprises:
emphasis values indicative of a relative importance of the pixels belonging to the region of interest with respect to other pixels in the image,
a first compression ratio to be employed while encoding the pixels belonging to the region of interest, when the encoded image is to be transported by utilizing at least a portion of an entire bandwidth of a communication channel.

In this regard, the term "emphasis value" refers to a value that indicates how much importance needs to be given in retaining an information of a given pixel in the image while encoding the given pixel. Notably, the emphasis values being indicative of the relative importance of the pixels belonging to the region of interest with respect to the other pixels in the image implies that the emphasis values indicate how much importance needs to be given in retaining the information of the pixels belonging to the region of interest while encoding in comparison to the other pixels in the image. It will be appreciated that the emphasis values of the pixels belonging to the region of interest are given a higher value in comparison to the other pixels in the image, so that more information of the pixels belonging to the region of interest is retained while encoding in comparison to the other pixels in the image. Throughout the present disclosure, the term "first compression ratio" refers to a value that determines an extent of compression that is applied to the pixels belonging to the region of interest while encoding in a scenario when the encoded image is to be transported by utilizing at least the portion of the entire bandwidth of the communication channel. Notably, utilizing at least the portion of the entire bandwidth of the communication channel to transport the encoded image implies that either some part of the entire bandwidth or the entire bandwidth itself of the communication channel is utilized in transporting the encoded image. In an implementation, when only some part of the entire bandwidth (for example, 10 percent) of the communication channel is utilized, then the first compression ratio is employed at a value that provides highest-feasible compression to achieve a highest-feasible perceived image quality for only some part of the entire bandwidth of the communication channel that is utilized. In another implementation, when the entire bandwidth of the communication channel is utilized, then the first compression ratio is employed at a value that provides lowest-feasible compression to preserve maximum visual detail and achieve a highest-feasible perceived image quality for the entire bandwidth of the communication channel that is utilized. A technical effect is that the pixels belonging to the region of interest are encoded with a higher emphasis which minimizes the loss of information for the pixels belonging to the region of interest in comparison to the other pixels in the image.

Optionally, the emphasis values are determined based on an emphasis curve that defines how emphasis values vary with respect to a distance of a given point from a three-dimensional position of the gaze point. Throughput the present disclosure, the term "emphasis curve" refers to a mathematical relation that represents how the emphasis values vary with a change in distance of the given point from the three-dimensional (3D) position of the gaze point. Notably, as the distance of the given point from the 3D position of the gaze point increases, the emphasis values in the emphasis curve decreases because as the distance of the given point from the 3D position of the gaze point increases, the given point moves farther away from the focus of the user's gaze on the gaze point. Notably, variation in the emphasis values in the emphasis curve may not be uniform over all directions. For example, emphasis values may reduce drastically with respect to an increase in a distance of a point along a direction in which the gaze depth changes. Alternatively, the emphasis values may reduce gradually with respect to an increase in a distance of a point along a plane that lies at a distance equal to the gaze depth from the user's eyes. A technical effect is that the emphasis values for each pixel in the image is clearly defined via the emphasis curve.

Optionally, the at least one server is further configured to:
obtain a baseline encoding setting map comprising baseline foveated encoding settings for the image, wherein the baseline foveated encoding settings comprise a first baseline encoding setting for pixels belonging to the gaze-contingent region, and a second baseline encoding setting for pixels belonging to a peripheral region of the image; and
determine a modulation that is to be applied to the first baseline encoding setting, wherein the first encoding setting is equal to the modulated first baseline encoding setting.

In this regard, the term "baseline foveated encoding settings" refers to predefined encoding settings to be applied to different regions of the image. Throughout the present disclosure, the term "baseline encoding setting map" refers to a mapping of the image that contains information related to what are the baseline foveated encoding settings that are to be applied for the image. Optionally, the baseline encoding setting map is obtained from one of: the rendering application executed on the at least one server, a data repository communicably coupled with the at least one server, the client device. Throughout the present disclosure, the term "first baseline encoding setting" refers to that predefined value of the encoding setting that is to be applied for the pixels belonging to the gaze-contingent region. Throughout the present disclosure, the term "second baseline encoding setting" refers to that predefined value of the encoding setting that is to be applied for the other pixels of the image. Notably, the first baseline encoding setting needs to be modulated to ensure that the pixels belonging to the region of interest in the gaze-contingent region are encoded with the minimum loss of information. Subsequently the modulated first baseline encoding setting that is obtained by the modulating the first baseline encoding setting is the first encoding setting that is applied to the pixels belonging to the region of interest.

Optionally, when encoding the image, the at least one server is further configured to:
apply a second encoding setting to remaining pixels in the image, wherein the second encoding setting is different from the first encoding setting; or
apply a second encoding setting to remaining pixels in the gaze-contingent region and a third encoding setting to further remaining pixels in a peripheral region of the image, wherein the second encoding setting and the third encoding setting are different from each other and from the first encoding setting.

In this regard, the term "second encoding setting" refers to those specific adjustments that are made in encoding the remaining pixels in the image. Throughout the present disclosure, the term "remaining pixels in the image" are those pixels left in the image after eliminating the pixels belonging to the region of interest from the image. Notably, the second encoding setting comprises: emphasis values indicative of a relative importance of the remaining pixels in the image with respect to the pixels belonging to the region of interest, a second compression ratio to be employed while encoding the remaining pixels in the image. It will be appreciated that the emphasis values for the remaining pixels in the image are smaller than the emphasis values for the pixels belonging to the region of interest, and the second compression ratio is greater than the first compression ratio.

Alternatively, the term "second encoding setting" refers to those specific adjustments that are made in encoding the remaining pixels in the gaze-contingent region. Throughout the present disclosure, the term "remaining pixels in the gaze-contingent region" refers to those pixels left in the gaze-contingent region after eliminating the pixels belonging to the region of interest from the pixels belonging to the gaze-contingent region. In this regard, the term "third encoding setting" refers to those specific adjustments that are made in encoding the remaining pixels in the further remaining pixels in the peripheral region of the image. Throughout the present disclosure, the term "further remaining pixels in the peripheral region of the image" refers to those pixels left in the image after eliminating the pixels belonging to the gaze-contingent region from the pixels in the image. Notably, the third encoding setting comprises: emphasis values indicative of a relative importance of the further remaining pixels in the peripheral region of the image with respect to the remaining pixels in the gaze-contingent region, a third compression ratio to be employed while encoding the further remaining pixels in the peripheral region of the image. It will be appreciated that the emphasis values for the further remaining pixels in the peripheral region of the image are smaller than the emphasis values for the remaining pixels in the gaze-contingent region, and the third compression ratio is greater than the second compression ratio.

Notably, the image that is encoded is sent to the client device for the image to be displayed to the user via the client device for the XR applications. It will be appreciated that the encoded image sent to the client device enhances a visual experience of the user as the pixels belonging to the region of interest where the user's gaze is focused, are displayed with a higher visual quality in comparison to the pixels belonging to the remaining part of the image. Notably, the encoded image that is sent to the client device is suitable to be used for the XR applications even those scenarios when the XR applications are implemented using the networks with low bandwidth.

The present disclosure also relates to the method as described above. Various embodiments and variants disclosed above, with respect to the aforementioned system, apply mutatis mutandis to the method.

Optionally, the region of interest further comprises pixels that lie within a second predefined distance from the gaze point.

Optionally, the first encoding setting comprises:
emphasis values indicative of a relative importance of the pixels belonging to the region of interest with respect to other pixels in the image,
a first compression ratio to be employed while encoding the pixels belonging to the region of interest, when the encoded image is to be transported by utilizing at least a portion of an entire bandwidth of a communication channel.

Optionally, the emphasis values are determined based on an emphasis curve that defines how emphasis values vary with respect to a distance of a given point from a three-dimensional position of the gaze point.

Optionally, the method further comprises:
obtaining a baseline encoding setting map comprising baseline foveated encoding settings for the image, wherein the baseline foveated encoding settings comprise a first baseline encoding setting for pixels belonging to the gaze-contingent region, and a second baseline encoding setting for pixels belonging to a peripheral region of the image;
determining a modulation that is to be applied to the first baseline encoding setting, wherein the first encoding setting is equal to the modulated first baseline encoding setting.

Optionally, when encoding the image, the method comprises:
applying a second encoding setting to remaining pixels in the image, wherein the second encoding setting is different from the first encoding setting; or
applying a second encoding setting to remaining pixels in the gaze-contingent region and a third encoding setting to further remaining pixels in a peripheral region of the image, wherein the second encoding setting and the third encoding setting are different from each other and from the first encoding setting.

Optionally, when determining the gaze point and the gaze depth of the user's eyes, the method comprises one of:
identifying the gaze point to be a point in a previous image at which the gaze directions of the user's eyes converged, and identify the gaze depth to be an optical depth associated with said point in an environment represented by the previous image;

identifying the gaze point to be a point in a previous image at which the gaze directions of the user's eyes converged, and identify the gaze depth to be an optical depth at which at least one autofocus camera was focused for capturing a previous real-world image, wherein the previous image comprises the previous real-world image;

identifying the gaze point to be a point in a previous image at which the gaze directions of the user's eyes converged, and determine the gaze depth using a depth value of a virtual object present at said point;

predicting the gaze point to be a point in the image at which the gaze directions of the user's eyes are expected to converge at a future time instant, and identify the gaze depth to be an optical depth associated with said point in an environment represented by the image.

DETAILED DESCRIPTION OF THE DRAWINGS

Referring to FIG. 1, illustrated is a block diagram of a system 100, in accordance with an embodiment of the present disclosure. As shown, the system comprises at least one server (depicted as a server 102). The server 102 is communicably coupled with a client device 104 to obtain information indicative of gaze directions of a user's eyes from the client device 104 and to send an image that is encoded to the client device 104.

Figure 2A:
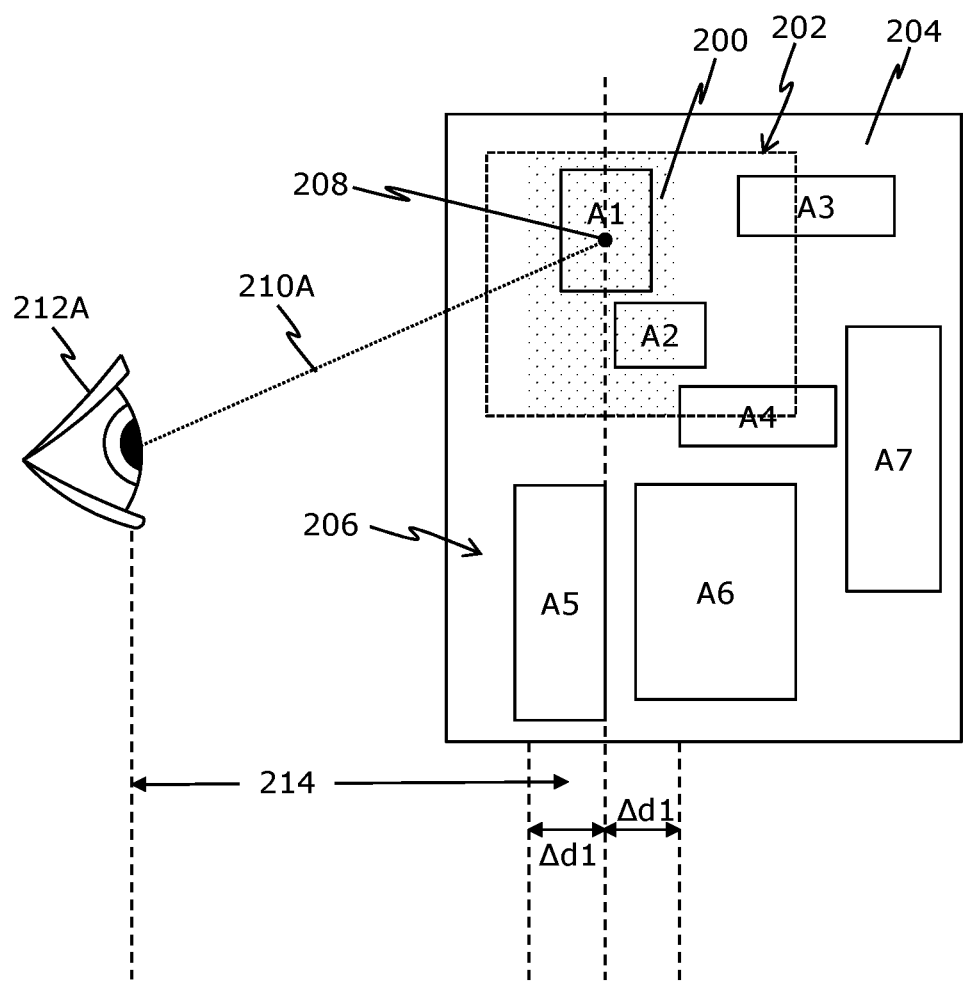
FIG. 2A is a schematic illustration of a side view of a region of interest identified in a gaze-contingent region in an image, in accordance with an embodiment of the present disclosure.

Referring to FIG. 2A, illustrated is a schematic illustrations of a side view of a region of interest 200 identified in a gaze-contingent region 202 in an image 204, in accordance with an embodiment of the present disclosure. As shown, an environment 206 is represented in the image 204, where objects A1-A7 are present in the environment 206. Moreover, a gaze point 208 is determined in the image 204 using information indicative of a gaze direction 210A of a user's first eye 212A and a gaze direction (not shown) of a user's second eye (not shown), and subsequently, a gaze depth 214 is determined from the gaze point 208. Furthermore, the gaze-contingent region 202 is identified in the image 204 that includes and surrounds the gaze point 208. Furthermore, the region of interest 200 is identified in the gaze-contingent region 202, wherein the region of interest 202 comprises pixels whose optical depth lies within a first predefined distance $\Delta d1$.

Figure 2B:
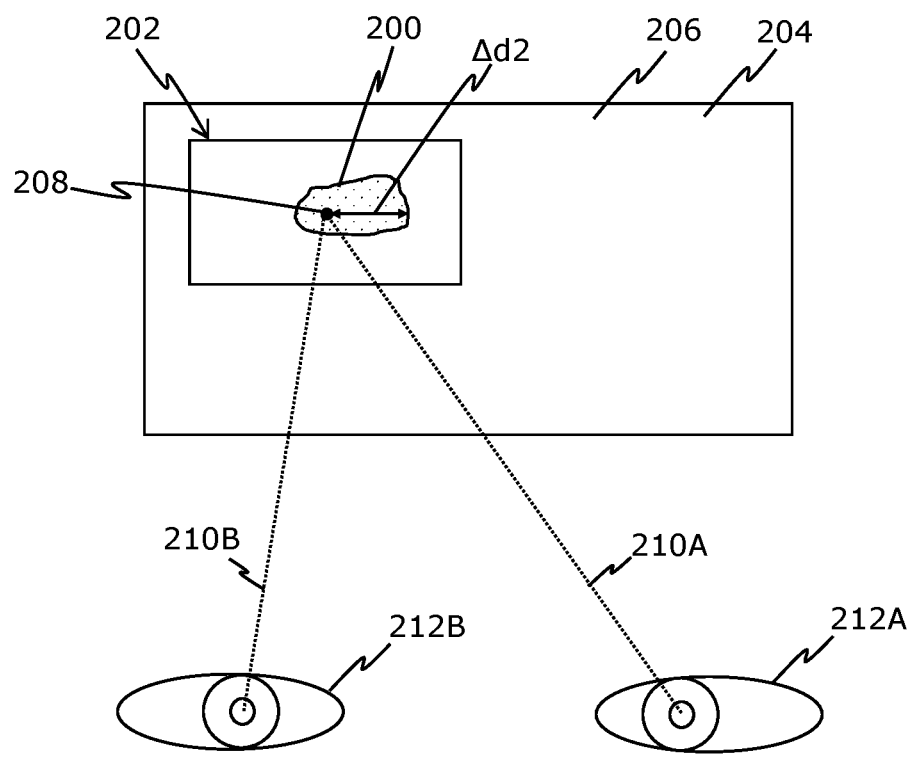
FIG. 2B is a schematic illustration of a front view of the region of interest identified in the gaze-contingent region in the image, in accordance with an embodiment of the present disclosure.

Referring to FIG. 2B, illustrated is a schematic illustrations of a side view of the region of interest 200 identified in the gaze-contingent region 202 in the image 204, in accordance with an embodiment of the present disclosure. As shown, the gaze point 208 is determined in the image 204 using information indicative of gaze directions (depicted as a first gaze direction 210A and a second gaze direction 210B) of a user's eyes (depicted as a first eye 212A and a second eye 212B), and subsequently, the gaze depth 214 is determined from the gaze point 208. Furthermore, the gaze-contingent region 202 is identified in the image 204 that includes and surrounds the gaze point 208. Furthermore, the region of interest 200 is identified in the gaze-contingent region 202, wherein the region of interest 202 comprises pixels that lie within a second predefined distance $\Delta d2$.

Figure 3:
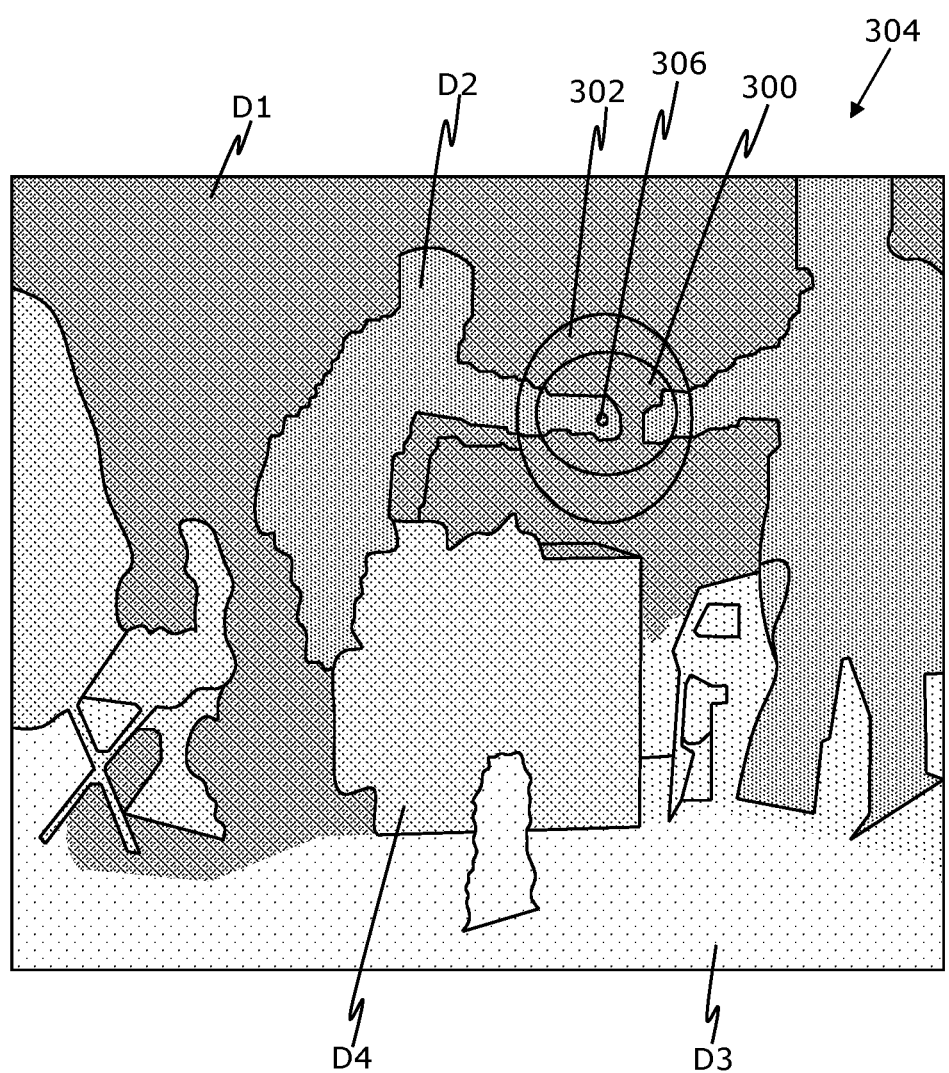
FIG. 3 is a schematic illustration of a front view of a region of interest identified in a gaze-contingent region in a depth image, in accordance with an embodiment of the present disclosure.

Referring to FIG. 3, illustrated is a schematic illustration of a front view of a region of interest 300 identified in a gaze-contingent region 302 in a depth image 304, in accordance with an embodiment of the present disclosure. As shown, objects represented in the depth image 304 are at four different depths which are D1-D4. Herein, a gaze point 306 is determined in the depth image 304. Moreover, the gaze-contingent region 302 is identified in the depth image 304 that includes and surrounds the gaze point 306. Furthermore, the region of interest 300 is identified in the gaze-contingent region 302.

Figure 4:
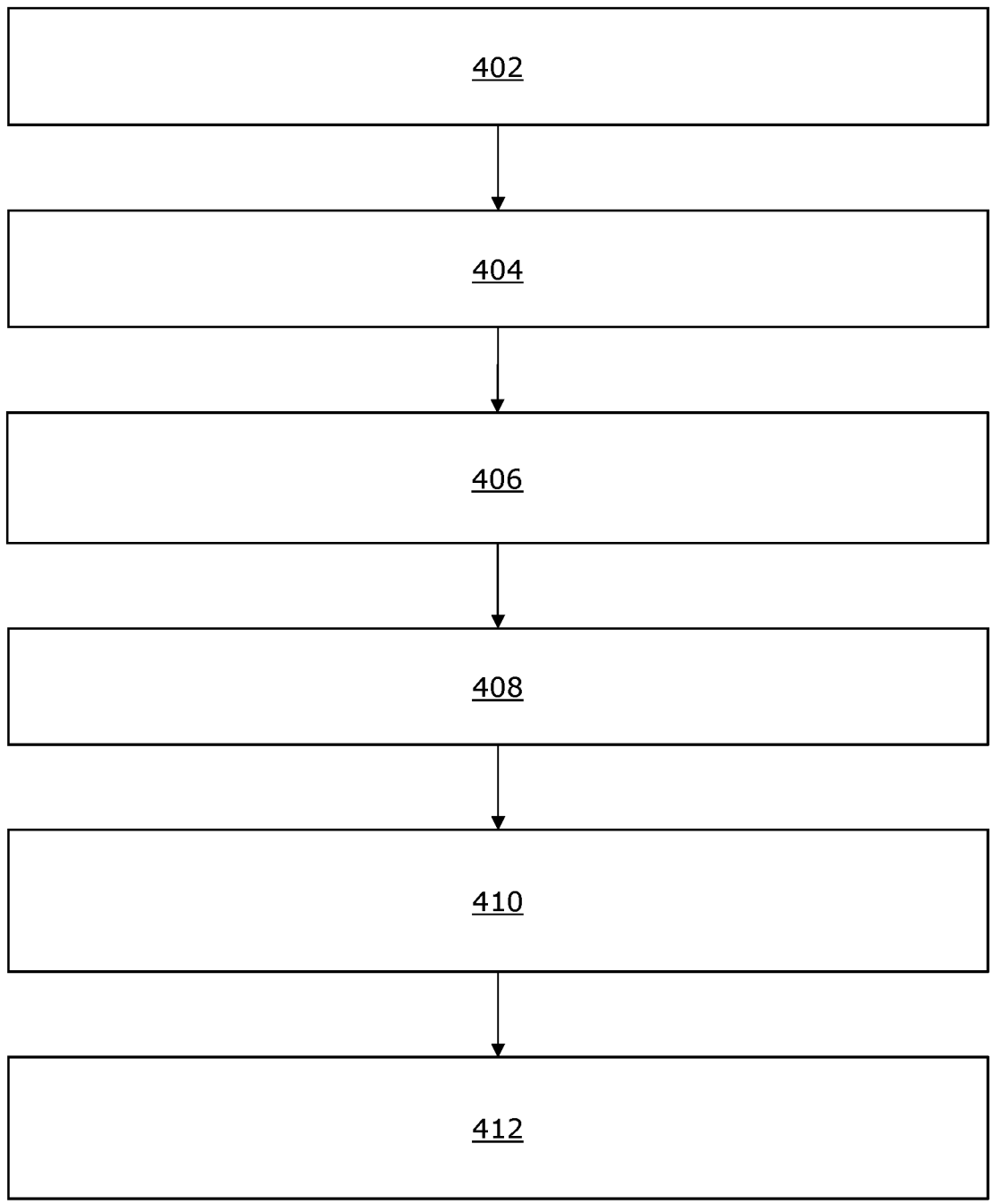
FIG. 4 is an illustration of a flowchart depicting steps of a method, in accordance with an embodiment of the present disclosure.

Referring to FIG. 4, illustrated is a flowchart depicting steps of a method, in accordance with an embodiment of the present disclosure. At step 402, information indicative of gaze directions of a user's eyes, is received, from a client device. At step 404, a gaze point and a gaze depth of the user's eyes are determined, using said information. At step 406, a gaze-contingent region is identified, in an image, that includes and surrounds the gaze point. At step 408, a region of interest is identified in the gaze-contingent region, wherein the region of interest comprises pixels whose optical depth lies within a first predefined distance from the gaze depth. At step 410, the image is encoded by applying a first encoding setting to the pixels belonging to the region of interest. At step 412, the image that is encoded is sent, to the client device.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system comprising at least one server configured to:
    receive, from a client device, information indicative of gaze directions of a user's eyes;
    determine a gaze point and a gaze depth of the user's eyes, using said information;
    identify, in an image, a gaze-contingent region that includes and surrounds the gaze point;
    identify a region of interest in the gaze-contingent region, wherein the region of interest comprises pixels whose optical depth lies within a first predefined distance ($\Delta d1$) from the gaze depth;
    encode the image by applying a first encoding setting to the pixels belonging to the region of interest, wherein the first encoding setting comprises:
        emphasis values indicative of a relative importance of the pixels belonging to the region of interest with respect to other pixels in the image, wherein the emphasis values are determined based on an emphasis curve that defines how emphasis values vary with respect to a distance of a given point from a three-dimensional position of the gaze point, and
        a first compression ratio to be employed while encoding the pixels belonging to the region of interest, when the encoded image is to be transported by utilizing at least a portion of an entire bandwidth of a communication channel; and
    send the image that is encoded, to the client device.

2. The system of claim 1, wherein the region of interest further comprises pixels that lie within a second predefined distance ($\Delta d2$) from the gaze point.

3. The system of claim 1, wherein the at least one server is further configured to:

obtain a baseline encoding setting map comprising baseline foveated encoding settings for the image, wherein the baseline foveated encoding settings comprise a first baseline encoding setting for pixels belonging to the gaze-contingent region, and a second baseline encoding setting for pixels belonging to a peripheral region of the image; and determine a modulation that is to be applied to the first baseline encoding setting, wherein the first encoding setting is equal to the modulated first baseline encoding setting.

4. The system of claim 1, wherein when encoding the image, the at least one server is further configured to:

apply a second encoding setting to remaining pixels in the image, wherein the second encoding setting is different from the first encoding setting; or apply a second encoding setting to remaining pixels in the gaze-contingent region and a third encoding setting to further remaining pixels in a peripheral region of the image, wherein the second encoding setting and the third encoding setting are different from each other and from the first encoding setting.

5. The system of claim 1, wherein when determining the gaze point and the gaze depth of the user's eyes, the at least one server is configured to perform one of:

identify the gaze point to be a point in a previous image at which the gaze directions of the user's eyes converged, and identify the gaze depth to be an optical depth associated with said point in an environment represented by the previous image;

identify the gaze point to be a point in a previous image at which the gaze directions of the user's eyes converged, and identify the gaze depth to be an optical depth at which at least one autofocus camera was focused for capturing a previous real-world image, wherein the previous image comprises the previous real-world image;

identify the gaze point to be a point in a previous image at which the gaze directions of the user's eyes converged, and determine the gaze depth using a depth value of a virtual object present at said point;

predict the gaze point to be a point in the image at which the gaze directions of the user's eyes are expected to converge at a future time instant, and identify the gaze depth to be an optical depth associated with said point in an environment represented by the image.

6. The system of claim 1, wherein the image is any image for which per-pixel depth information is available to the at least one server, said image being at least one of:

a virtual-reality image, a depth image captured by a depth sensor, a real-world depth image captured by a depth sensor-based video see-through camera; an image reconstructed using a three-dimensional data structure representing a three-dimensional environment.

7. A method comprising:

receiving, from a client device, information indicative of gaze directions of a user's eyes;

determining a gaze point and a gaze depth of the user's eyes, using said information;

identifying, in an image, a gaze-contingent region that includes and surrounds the gaze point;

identifying a region of interest in the gaze-contingent region, wherein the region of interest comprises pixels whose optical depth lies within a first predefined distance ($\Delta d1$) from the gaze depth;

encoding the image by applying a first encoding setting to the pixels belonging to the region of interest, wherein the first encoding setting comprises:

emphasis values indicative of a relative importance of the pixels belonging to the region of interest with respect to other pixels in the image, wherein the emphasis values are determined based on an emphasis curve that defines how emphasis values vary with respect to a distance of a given point from a three-dimensional position of the gaze point; and a first compression ratio to be employed while encoding the pixels belonging to the region of interest, when the encoded image is to be transported by utilizing at least a portion of an entire bandwidth of a communication channel; and sending the image that is encoded, to the client device.

8. The method of claim 7, wherein the region of interest further comprises pixels that lie within a second predefined distance ($\Delta d2$) from the gaze point.

9. The method of claim 7, further comprising:

obtaining a baseline encoding setting map comprising baseline foveated encoding settings for the image, wherein the baseline foveated encoding settings comprise a first baseline encoding setting for pixels belonging to the gaze-contingent region, and a second baseline encoding setting for pixels belonging to a peripheral region of the image;

determining a modulation that is to be applied to the first baseline encoding setting, wherein the first encoding setting is equal to the modulated first baseline encoding setting.

10. The method of claim 7, wherein when encoding the image, the method comprises:

applying a second encoding setting to remaining pixels in the image, wherein the second encoding setting is different from the first encoding setting; or applying a second encoding setting to remaining pixels in the gaze-contingent region and a third encoding setting to further remaining pixels in a peripheral region of the image, wherein the second encoding setting and the third encoding setting are different from each other and from the first encoding setting.

11. The method of claim 7, wherein when determining the gaze point and the gaze depth of the user's eyes, the method comprises one of:

identifying the gaze point to be a point in a previous image at which the gaze directions of the user's eyes converged, and identify the gaze depth to be an optical depth associated with said point in an environment represented by the previous image;

identifying the gaze point to be a point in a previous image at which the gaze directions of the user's eyes converged, and identifying the gaze depth to be an optical depth at which at least one autofocus camera was focused for capturing a previous real-world image, wherein the previous image comprises the previous real-world image;

identifying the gaze point to be a point in a previous image at which the gaze directions of the user's eyes converged, and determine the gaze depth using a depth value of a virtual object present at said point;

predicting the gaze point to be a point in the image at which the gaze directions of the user's eyes are expected to converge at a future time instant, and identify the gaze depth to be an optical depth associated with said point in an environment represented by the image.

* * * * *